US005620790A

United States Patent [19]

Holzki et al.

[11] Patent Number: 5,620,790

[45] Date of Patent: Apr. 15, 1997

[54] MULTI-LAYER MICROFILTRATION MEMBRANE HAVING AN INTEGRATED PREFILTRATION LAYER AND METHOD OF MAKING SAME

[75] Inventors: Udo Holzki, Worrstadt; Heinz-Joachim Muller, Bad Kreuznach; Tilo Renner, Langenionsheim, all of Germany

[73] Assignee: Seitz-Filter-Werke GmbH und Co., Kreuznach, Germany

[21] Appl. No.: 494,189

[22] Filed: Jun. 23, 1995

[30] Foreign Application Priority Data

Jun. 23, 1994 [DE] Germany .......................... 44 21 871.0

[51] Int. Cl.[6] .......................... B01D 69/12; B01D 71/06; B01D 71/16; B01D 71/68

[52] U.S. Cl. .................................. 428/315.9; 210/500.27; 210/500.29; 210/500.3; 210/500.31; 210/500.32; 210/500.41; 210/500.42; 210/504; 210/506; 210/510.1; 428/316.6

[58] Field of Search ............................. 428/315.9, 316.6; 210/500.27, 500.29, 500.3, 500.31, 500.32, 500.41, 500.42, 504, 506, 510.1

[56] References Cited

U.S. PATENT DOCUMENTS

| | | | |
|---|---|---|---|
| 4,340,480 | 7/1982 | Pall et al. . | |
| 4,419,242 | 12/1983 | Cheng et al. | 210/500.29 |
| 4,863,792 | 9/1989 | Mrozinski | 428/315.5 |
| 4,877,679 | 10/1989 | Leatherman et al. | 428/315.5 |
| 4,933,081 | 6/1990 | Sasaki et al. | 210/500.41 |
| 5,084,178 | 1/1992 | Miller et al. | 210/500.29 |
| 5,228,994 | 7/1993 | Tkacik et al. | 210/500.29 |
| 5,240,615 | 8/1993 | Fishman | 210/500.42 |
| 5,500,167 | 3/1996 | Degen | 210/500.42 |

FOREIGN PATENT DOCUMENTS

| | | |
|---|---|---|
| 0083489 | 7/1983 | European Pat. Off. . |
| 0594007 | 4/1994 | European Pat. Off. . |
| 3740871 | 6/1988 | Germany . |
| 3701633 | 8/1988 | Germany . |
| 3818860 | 12/1989 | Germany . |
| 4000825 | 5/1990 | Germany . |
| 4007383 | 9/1991 | Germany . |

OTHER PUBLICATIONS

Eberhard Staude; Membranen und Membranprozesse; 1992; p. 10.

Robert Kesting; Synthetic Polymeric Membranes; 1985; p. 237.

*Primary Examiner*—James C. Cannon
*Attorney, Agent, or Firm*—Robert W. Becker & Associates

[57] ABSTRACT

A multi-layer microfiltration membrane having an integrated prefiltration layer. Pursuant to a phase inversion process, several layers are successively poured out onto one another prior to phase separation of a lower layer, with the viscosity for the pour solution decreasing toward the upper layers. This produces a microporous, multi-layer, integral filtration membrane having a homogenous symmetrical pore structure for the final filtration layer and an open-pored structure for the prefiltration layer disposed therebelow. Even with small pore diameters, this membrane can be easily pleated for installation in filter cartridges without the formation of damage at the crease edges. High throughput rates are possible at a low tendency to clog.

20 Claims, 1 Drawing Sheet

MULTI-LAYER MICROFILTRATION MEMBRANE HAVING AN INTEGRATED PREFILTRATION LAYER AND METHOD OF MAKING SAME

BACKGROUND OF THE INVENTION

The present invention relates to a multi-layer, unsupported, integral microfiltration (MF) membrane of polymeric material, with the exception of aliphatic polyamide, that is suitable for a phase inversion process, the MF membrane having at least one final filter layer and at least one integrated prefiltration layer. The present invention also relates to a method of making such a membrane.

Microfiltration membranes are known. Such membranes generally have pore diameters in the range of from 0.01 to 10 μm. Microfiltration membranes can be classified as follows:

a) Symmetrical membranes where the diameters of the micropores remain practically constant throughout their thickness, so that both sides have nearly the same pore diameters;

b) Asymmetrical membranes, where a thin 0.1 to 0.25 μm dense skin layer is placed upon and integrally bonded to a porous substrate member. The skin determines not only the permeability but also the permselectivity of the dual layer membrane, while the porous substrate member essentially serves as a support structure for the skin;

c) Composite membranes, which in principle constitute an asymmetrical membrane having a skin, with the skin and the support structure being made of different polymeric materials. The support material is already embodied as an asymmetrical membrane upon which the thin skin layer is then disposed.

Whereas composite membranes are essentially used for reverse osmosis, pervaporation, and gas separation, and less frequently for microfiltration purposes, symmetrical and asymmetrical membranes are frequently utilized in the microfiltration industry.

Although symmetrical microfiltration membranes generally offer a high retention rate and are also relatively reliable due to their homogeneous membrane structure, they nonetheless have a low flow rate since they offer a great resistance to the fluid stream during filtration. Due to the relatively low porosity and to the approximately two dimensional surface configuration, such membranes unfortunately tend to clog up relatively rapidly, which is reflected in a limited sludge carrying capacity (fouling), so that the useful filtration time is very short (DE-OS 37 01 633). In contrast, asymmetrical membranes offer a long service time if the flow is on the coarse-pored side since the smallest particles that are to be filtered out can be essentially caught by the density of the skin and hence the entire thickness of the membrane can be effectively utilized, thus increasing the flow rate. However, since the dense skin is disposed at the surface, scratches can easily occur there, thus significantly reducing the reliability and the retention rates (DE-OS) 37 40 871).

EP 05 94 007 A1 discloses an integral composite membrane for microfiltration where a separating layer is at a later stage poured onto a prefabricated symmetrical membrane that is to serve as a prefiltration layer. The thickness of this separating layer ranges from 2 to a maximum of 40 μm.

Due to the method of manufacturing disclosed in EP 05 94 007, it is clear to one skilled in the art that the subsequently poured-on separating layer must relate to an asymmetrical layer. For example, it is indicated that the solution for effecting the coagulation is contacted by a nonsolvent; otherwise, no nonsolvent fraction in the polymer solution is mentioned in this reference. Pursuant to Staude "Membranen und Membranprozesse", Weinheim 1992, page 10 et seq, it is made clear that both conditions indicate the formation of asymmetrical membranes. However, it is evident that such membranes have relatively poor useful lives.

In DE-OS 37 01 633 and DE-OS 37 40 871 the drawbacks discussed in connection with asymmetrical membranes, the fragile separating layer (skin) is disposed in the interior of the membrane, and hence is better protected, via a controlled step in a dry-wet process. However, as before there is still the drawback of a relatively thin separating layer, so that faults that might be present in the membranes, such as oversized pores, can significantly impair the retention characteristic of the membranes. In EP 0 083 489 B1, the problems related to the sensitivity of the skin of asymmetrical microfiltration membranes are addressed by superimposing two asymmetrical membranes upon one another in such a way that their skins contact one another. However, this approach has the drawback that the manufacturing process is relatively expensive and complicated, and furthermore the pore characteristic established by the pore sizes of the skin relative to the exclusion magnitude of particles varies as a consequence of the static arrangement of respectively oppositely disposed pores or matrix material.

If fine-pored microfiltration membranes having nominal pore sizes of less than 0.45 μm are installed in filter cartridges, the porosity of these membranes at their edges is greater than the porosity at their surfaces. As a consequence, the filtration characteristics established by the pore characteristic of the membrane are not achieved. Thus, DE-PS 3 818 860 utilizes a combination of at least three membranes having different materials and different pore sizes and pore geometries, so that the coarse-pored membrane performs the function of a preliminary filter and the fine-pored membrane performs the function of a final filter. Thus, with this hybrid technology fine-pored microfiltration membranes having nominal pore sizes of less than 0.45 μm can also be used in filter cartridges. However, the drawback is that during installation in the filter cartridges, the membranes that are placed one upon the other are not as easy to handle as are individual membranes. When the filter cartridges are sterilized with steam, the outer membrane layers can swell, which leads to damage. U.S. Pat. No. 4,340,480 discloses an individual multi-layer membrane having integral individual layers where the individual layers are pressed upon one another in a wet state and are dried together. However, this method of manufacture is possible only with such polymers that have a high water absorbtiveness, such as polyamide 66, which is used in this reference and has a water absortiveness (saturation) of 8.5% by weight.

It is therefore an object of the present invention to provide microfiltration membranes which, as individual membranes, are built up from two or more integral layers, which while exhibiting a high retention rate and a high reliability at the same time have a high sludge carrying capacity (service life), which are economically made of the same membrane material, whereby polymeric material having a low water absortivity can also be used, and which, with a nominal pore size of below 0.45 μm, can also be used in membrane filter cartridges without difficulty.

SUMMARY OF THE INVENTION

The microfiltration membrane of the present invention is characterized primarily in that the final filter layer has a thickness of between 50 and 300 μm and a symmetrical pore structure, with the ratio of the thickness of the final filter layer to the thickness of the prefiltration layer ranging from between 1:4 to 4:1. As a consequence, in contrast to the heretofore known MF membranes, the inventive membranes, when used as a filter, advantageously provide a high retention rate coupled with a minimum clogging of the MF membranes. The combination of an integrated final filter layer, which is symmetrical with respect to its pore structure and is relatively thick, with at least one integrated prefiltration layer, provides an extremely serviceable MF membrane that can be manufactured relatively economically with simple means, and that is much more sturdy than are asymmetrical membranes. Thus, due to a uniform pore structure of the final filter layer in conjunction with a thickness thereof of 50 to about 300 μm, slight damages that would already lead to failure, i.e., total loss, of the known membranes, can be tolerated.

Pursuant to the inventive method of producing a multilayer, unsupported, integral microfiltration membrane, in contrast to pouring a polymer solution onto a substrate, whereupon the solvent is either evaporated off or a vapor of a nonsolvent is diffused in and the finished membrane is washed and then dried, the present invention is characterized primarily in that after a layer of a solution of polymeric material is poured out onto a substrate in a manner known per se, one or more further layers of a solution of polymeric material are poured out one after the other onto the first layer, in each case prior to the time that turbidity of the first layer sets in, whereby the viscosity of each subsequent layer of a solution of polymeric material is the same or is less than that of the previously poured out solution of polymeric material.

Thus, the object of the present invention is inventively resolved in that in a phase inversion process pursuant to the drying method, a layer of a solution of polymeric material is initially poured out onto the substrate, and subsequently one or more layers of a further solution of polymeric solution, preferably having the same membrane-forming polymeric material, are poured out onto the previously poured-out layer, respectively prior to the occurrence of turbidity of this layer, with the viscosity of a respective poured-out solution of polymeric material being such that it as most the same as or less than the viscosity of the previously poured-out solution of polymeric material. In this way, a microporous, multi-layer, integral filtration membrane (MF membrane) is obtained, the final filter layer of which has a homogeneous and symmetrical pore structure and that can have a sufficient thickness in order to retain the particles that are to be filtered at an appropriate retention rate. One or more open-pored prefiltration layers of the same membrane material are integrally connected with this final filter layer, as a result of which a larger porosity is available for that side of the membrane that receives the flow.

As a result of the drying method that is used, and which is described, for example, in DE-OS 40 00 825 and DE-OS 40 07 383, where the membrane is manufactured by contact with moist air, the characteristic symmetrical, microporous membrane layers are produced. In this drying process, the steam diffuses uniformly into the membrane layer, so that the phase separation during the formation of the membrane and the setting of the polymer matrix effects a pore formation that is uniform throughout the thickness, without it being necessary to immerse the poured-out film into a setting bath, which results in the formation of a skin layer. A number of polymers that are suitable for the phase inversion method can be used as the polymeric material, including polysulfone (PSU), polyethersulfone, aliphatic and aromatic polyamides, cellulose derivatives, as well as the rest of the polymers that are soluble in a solvent and can be set by nonsolvents. The phase inversion process is known, for example, from "Kesting, Robert E., Synthetic polymeric membranes, Wiley & Sons, 1985, p. 237" or "Staude, E., Membranen und Membranprozesse, VCH-Weinheim 1992, p. 10 et seq."

Cellulose derivatives means all polymers that can be produced by chemical modification and that are suitable for the membranes and manufacturing processes disclosed in connection with the invention. In particular, such polymers are essentially those that are not soluble in water and soluble in certain organic solvents; they should have such a stability and density that they can be used as a membrane. Cellulose derivatives that can be used include, for example, cellulose diacetate, cellulose triacetate, cellulose propionate, cellulose butyrate, polymer mixtures of the aforementioned compounds, ethyl cellulose, and/or cellulose nitrate.

Pursuant to the present invention, the membranes are manufactured in such a way that a first layer of a solution of polymeric material is spread onto a substrate, whereupon a second layer, and if necessary also further layers, are poured out over this first layer. Unexpectedly, no mixing together of the individual layers takes place, as long as two conditions are fulfilled: first of all, the viscosities for the respective solution of polymeric material must be at most the same, or better yet, the viscosities for the respective solutions of polymeric material should decrease outwardly from the substrate; second of all, a respective layer should be poured out onto the layer disposed therebelow when the lower layer has not yet experienced a phase separation, in other words, prior to the beginning of turbidity.

The upper limit of the viscosity for the respective polymer solutions is about 100 Pa.s. Polymer solutions having a higher viscosity can no longer be poured out without any difficulty pursuant to the inventive method with a wiper or doctor blade. The practical lower limit is approximately 0.5 Pa.s (this corresponds approximately to a polymer concentration of 6% polysulfone and a molecular weight of 27,000). Polymer concentrations that are even lower are no longer very suitable since the layer that is wiped out can no longer set or harden to form a membrane; rather, only a noncohesive powder results. For practical utility, viscosity ranges between 0.5 and 25 Pa.s are preferred. Particularly preferred are viscosities in the range of from 0.8 to 20 Pa.s.

In principle, the viscosity of the respective polymer solution is established by the polymer content thereof. Polymers that can be used include not only the membrane-forming polymer, but also other compatible polymers that are soluble in the nonsolvent for the membrane-forming polymer; such other polymers include, for example, polyvinyl pyrrolidone (PVP) or polyethyleneglycol (PEG). The amount of these polymers, which are soluble in the nonsolvent, can, depending on the molecular weight, be between 0.1 and 100% by weight relative to the membrane-forming polymer. The practical limits of the amount of these additional polymers used results from the viscosity of the solution, which should not fall below or exceed the limits discussed above.

Thus, pursuant to the present invention, even where the successively poured-on layers have the same viscosity, different prefiltration and final filtration layers result, since the viscosity of the solution is established, among other things, by the membrane polymer (produces the pore size) and additives (increase the viscosity). In addition to the inventively preferred variants, namely establishing the viscosity of the respective polymer solution via the polymer content of the membrane-forming polymer or via the content of membrane-forming polymer plus the addition of one or more compatible polymers that are soluble in the nonsolvent for the membrane-forming polymer, the viscosity can also be affected by a series of other parameters. For example, the molecular weight of the membrane polymer, the molecular weight of the additives, selection of solvent and nonsolvent, as well as temperature can be important.

As indicated previously, the pore structure and the pore size of a respective layer can be predominantly controlled by the content of membrane-polymer in the pour solution intended for that purpose, in other words, the actual separating or filtering layer (preferably the final filter layer), which has the smallest pore sizes of the layers, consequently also has the greatest content of membrane-forming polymer. Thus, the position of the actual filtering layer, whether it be disposed outermost (terminally) or be sandwiched between two prefiltration layers, can be defined by the polymer composition of the respective pour solutions. The thickness of this filtration layer is between 50 and 300 μm, preferably between 50 and 250 μm, with nominal pore sizes of preferably 0.1 to 2 μm.

In connection with the inventive method, it is important that the viscosity of the lower layer, in other words the earlier poured-on layer, not be greater than the viscosity of the upper layer, in other words the layer poured thereon, since an intermixing of the layers could otherwise occur. In this connection, as already mentioned several times, it is possible for the lower layer to form larger pores than the upper layer since it contains less membrane-forming polymer. The necessary increase of the viscosity of the lower layer relative to the upper layer can in this case be effected by the selection of the type and quantity of additives that are suitable for controlling the viscosity.

Although the inventive membranes can also be produced where the viscosity of the respective pour solutions is the same, it is advantageous, during continuous production, to select the viscosities for the pour solutions such that the viscosity of the upper layer is less than the viscosity of the respective layer therebelow at least by a factor of two. The time between the successive pouring-on processes must be as short as possible. Times between 6 seconds and 2 minutes have shown to be advantageous. However, it should be noted that is not the time that is of critical importance, but rather the setting effect during this time. Thus, dry air has less of a setting effect than does moist air. However, a prerequisite with the sequential pouring process is that the respectively lower layer has not yet undergone a phase separation at the time that the layer disposed thereabove is poured on. This is the case because if the respective underneath layer already exhibits a phase separation, then the adhesion that occurs between this layer and the layer disposed thereabove is not great enough. For the applications contemplated for the inventive membrane, especially with respect to high sludge loading, at least two membranes, namely one prefiltration membrane and one final filter membrane, are required. Flow to the inventive membrane should then be effected from the prefiltration side. In principle, the inventive method also offers the possibility of sequentially pouring three or more layers in order in this manner to achieve a better progression of the membrane pore sizes. On the other hand, it is also conceivable to dispose the filter layer of the membrane internally, i.e. to embed it between two prefiltration layers. Theoretically, it is also possible to combine the two possible arrangements to thereby produce four or even five-layer membranes. However, this would not appear to be technically very meaningful since the higher cost for manufacturing has no relationship to the advantage that is achieved.

With an inventive membrane having a final filtering layer and a prefiltration layer, the ratio of the thicknesses of the prefiltration layer to the final filtration layer is 1:4 to 4:1, and preferably between 1:3 and 3:1. In this connection, the referenced ratios are preferably for membranes having only one prefiltration layer.

For an outermost filtering layer of multi-layer membranes there are in principle two possibilities for the manufacture:

a) First the pour solution for the final filtration layer is poured out onto the substrate, i.e., in the pour solution provided therefor, not only the polymer content on the whole but also the content of membrane-forming polymer are at their greatest. The pour solutions for the successive layers then have appropriately progressively diminishing viscosities.

b) One or more prefiltration layers are first poured out, followed by the final filtration layer as the uppermost layer. Since the pour solution for the layer that is poured out first should have the highest viscosity, this means that the pour solution, in addition to the actual membrane-forming polymer, must have more compatible polymer additives, such as, for example, PVP or PEG, than the next higher layer, in order to achieve a progressive porosity. The pour solution for the uppermost layer, which defines the actual filtering layer (final filtration layer), accordingly has the least overall polymer content, yet has the greatest content of membrane-forming polymer.

With the manufacture of such multi-layer membranes, it is also possible to produce membranes having integrated woven or fiber reinforcement. An appropriate fiber or woven material can either be introduced between the individual layers prior to phase separation, or can be disposed upon the uppermost membrane layer. This enables a very good spatial orientation of the fiber in the membrane, which otherwise could be achieved only via very complicated procedures. This furthermore very reliably prevents the introduction of air bubbles due to the fleece, since the lower solution film can be absorbed by the fiber and all air displaced before the next solution film is spread onto this layer.

It is also conceivable not to bring about the phase separation in the drawing process by diffusing in the nonsolvent, but rather by cooling of a hot solution of one or more polymers in a solvent mixture that forms a homogeneous fluid phase only above a certain temperature.

Further details of the present invention will be described in detail subsequently with the aid of a number of examples.

BRIEF DESCRIPTION OF THE DRAWING

X-ray or electron scanner microscope photographs show the membranes obtained pursuant to Examples 1 and 2. In particular.

DESCRIPTION OF PREFERRED EMBODIMENTS

Figure 1:
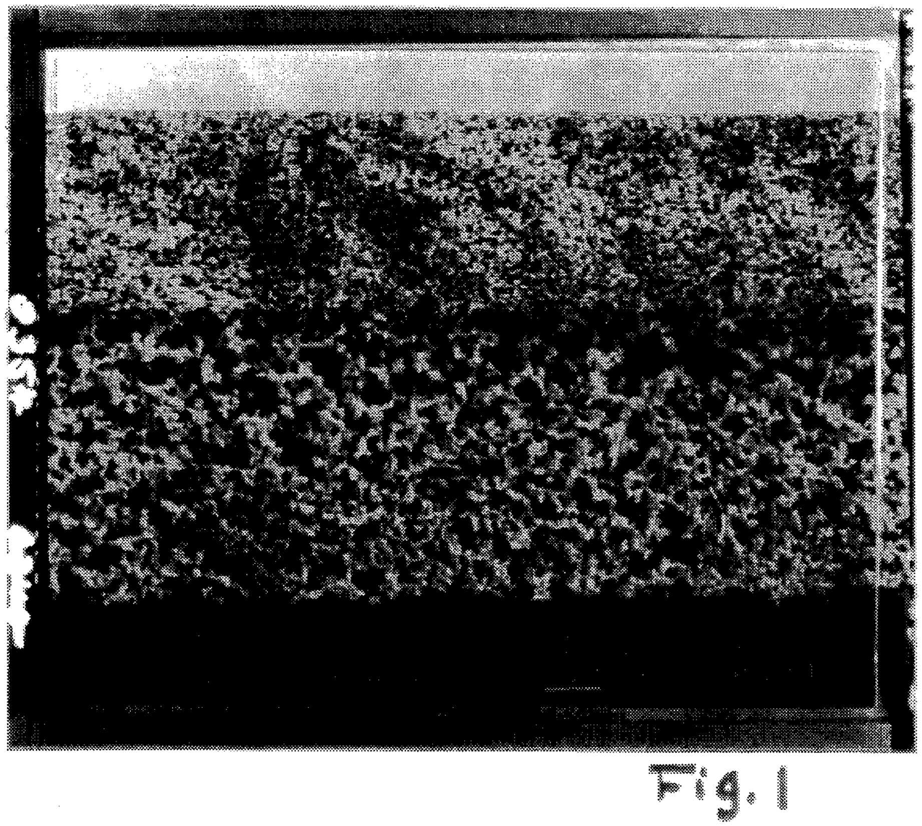
FIG. 1 is a 340 time cross-sectional enlargement of a membrane obtained pursuant to the method of Example 1.
Figure 2:
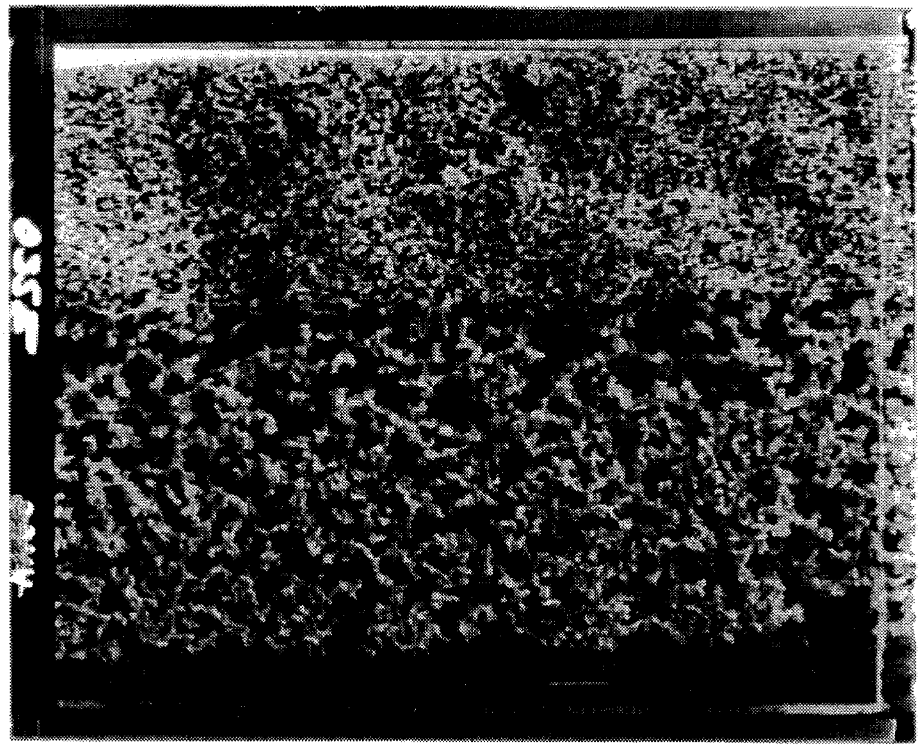
FIG. 2 is a 425 time cross-sectional enlargement through a membrane obtained pursuant to Example 2.

Model tests were carried out on the membranes obtained pursuant to Examples 1 to 3 to determine their tendency to clog. As a model solution, a 1% aqueous raw sugar solution was used. For this purpose, the sugar was dissolved in water and the turbid material was kept in suspension by continuous stirring. The solution was used within 12 hours in order to prevent the growth of bacteria and yeast. The temperature was 25° C.

To carry out the test, a circular membrane sample of 50 mm diameter was secured in a suitable filter holder and was supplied with the aforementioned raw sugar solution at a pressure of 1 bar. A liquid that flowed through was trapped. In so doing, the membrane became clogged and the throughput was constantly reduced. When the interval between two successive liquid drops was more than 30 seconds, the test was ended and the liquid quantity in question was measured. By translating this to the membrane surface that receives flow, the specific sludge carrying capacity of the membrane in ml solution per $cm^2$ of membrane is obtained.

With respect to the measurement of the membrane characteristics, it should be noted that for all examples polysulfone membranes without the addition of wetting agents (e.g. PVP) are not completely wetted. Therefore, with all the tests the membrane was basically first prewetted with ethanol and then thoroughly rinsed with water. The thus obtained wet membrane was then subjected to the respective tests.

The viscosities indicated in the examples were all measured with a viscosity measuring device according to DIN (German Industrial Standard) 53019 at a temperature of 25° C. and a shear rate of $111s^{-1}$.

The bacteria reduction for the MF membranes manufactured in Example 4 were determined pursuant to the test regulation DIN 58 355, section 3, relative to the bacteria pseudoma diminuta (size about 0.2 μm). The example shows that the retention rate became that must better the larger that the actual filter layer was. After a layer thickness of about 60 μm, the retention rate of the $>10^7$ per $cm^2$ filter surface required by the standard was achieved.

Examples 5 and 6 show the use of cellulose mixed esters or polyamides as suitable inventive membrane-forming materials.

EXAMPLE 1

A layer of 160 μm of a solution of 14% polysulfone in a solvent mixture of NMP (N-methyl-2-pyrrolidone) and PEG 400 was poured out onto a glass plate. The solution had the following composition:
PSU: 14.0% by weight
NMP: 28.7% by weight
PEG: 57.3% by weight The viscosity of this solution was 9.8 Pa.s. After 20 seconds, a further layer containing 9.5% polysulfone was applied, with a further doctor blade having a gap width of 320 μm being drawn with this solution over the first film. This solution had the following composition:
PSU: 9.5% by weight
NMP: 30.2% by weight
PEG 400: 60.3% by weight.

The viscosity of this solution was 1.4 Pa.s.

After setting of the membrane at 70% relative humidity and 25° C. in stationary air (30 minutes), the membrane was washed in water and dried.

For the membrane obtained in this manner the following parameters were determined:
Bubble point: 3.0 bar
Water flow: 42.5 ml/($cm^2$.min.bar)
Pore structure: see FIG. 1.

For the throughput up to clogging with a 1% aqueous raw sugar solution (model material) the following values were obtained:
Flow from the fine pored side: 2.8 ml/$cm^2$
Flow from the coarse pored side: 42.7 ml/$cm^2$.

EXAMPLE 2

Pursuant to Example 1, the following polymer solutions were successively poured out onto a glass plate:
Solution 1:
PSU: 12.0% by weight
NMP: 29.3% by weight
PEG 400: 58.7% by weight The viscosity of the solution was 4.2 Pa.s.
Solution 2:
PSU: 9.0% by weight
NMP: 30.3% by weight
PEG 400: 60.7% by weight The viscosity of this solution was 1.2 Pa.s. The following membrane parameters were determined:
Bubble point: 1.9 bar
Water flow: 81.0 ml/($cm^2$.min.bar)

For the throughput until clogging with a 1% aqueous raw sugar solution (model material) the following values were determined:
Flow from the fine pored side: 6.5 ml/$cm^2$
Flow from the coarse pored side: 67.5 ml/$cm^2$

EXAMPLE 3

Pursuant to Example 1, the following polymer solutions were successively spread onto a glass plate:
Solution 1:
PSU: 8% by weight
PVP (Molecular weight 360,000) 10.0% by weight
NMP: 27.3% by weight
PEG 400: 54.7% by weight The viscosity of this solution was 21 Pa.s.
Solution 2:
PSU: 14.0% by weight
NMP: 28.7% by weight
PEG 400: 57.3% by weight The viscosity of this solution was 9.8 Pa.s.

As membrane parameters the following values were determined:
Bubble point: 2.6 bar
Water flow: 51 ml/($cm^2$.min.bar)

For the throughput to clogging with a 1% aqueous raw sugar solution (model material) the following were determined:
Flow from fine pored side: 7.0 ml / $cm^2$
Flow from coarse pored side: 44.8 ml/$cm^2$ Each of the membranes manufactured pursuant to Examples 1 to 3 comprised two layers. In examples 1 and 2, the pour solutions for the final filtration layer were first poured out, with the pour solutions for the respective prefiltration layer than being poured thereover. In example 3, the pore solution for the prefiltration layer was first poured out, and then the pour solution for the final filtration layer.

During the determination of the throughput to clogging with a 1% aqueous raw sugar solution, it was shown that due to the different membrane structures on the two sides of the membrane, very different filtration capacities to clogging occurred, depending upon from which side flow to the corresponding membrane occurred.

EXAMPLE 4a–4f

In each case, a layer of a solution of polysulfone in a solvent mixture of NMP and PEG 400 was poured out onto a glass plate. The solution had the following composition:

PSU: 8%
PVP K 90: 3.1%
NMP: 59.3%
PEG 400: 29.6%

The viscosity of this solution was 11.3 Pa.s. After the prescribed time, a further layer was applied by drawing a further doctor blade having a new solution over the first film. This solution had the following composition:

PSU: 14.5%
NMP: 28.5%
PEG 400: 57%

The viscosity of this solution was 9.6 Pa.s.

After setting of the membrane at 78% relative humidity and 25° C. in stationary air (30 minutes), the membranes were respectively washed in water and dried. For the membranes thus obtained, the parameters provided in Table I were determined.

After setting of the membrane at 60% relative humidity and 25° C. in stationary air (120 minutes), the membrane was dried at 70° C. in a drying chamber.

The following parameters were determined for the thus-obtained membrane:

Bubble point: 4.1 bar
Water flow: 16.7 ml/cm$^2$min bar)

As throughput to clogging with a 1% aqueous raw sugar solution (model material) the following values were obtained:

Flow from fine-pored side: 62 ml/cm$^2$
Flow from coarse-pored side: 840 ml/cm$^2$

EXAMPLE 6

In conformity with Example 1 of DE 40 02 386, a layer of 160 μm of a solution of aromatic polyamide (NOMEX) in

TABLE I

TEST 4
Manufacture of multi-layered polysulfone membranes

| | Unit | 4a | 4b | 4c | 4d | 4e | 4f |
|---|---|---|---|---|---|---|---|
| Pour thickness 1 | μm | 80 | 110 | 150 | 200 | 230 | 260 |
| Pour thickness 2 | μm | 320 | 320 | 320 | 320 | 320 | 320 |
| Difference (=2 layers) | μm | 240 | 210 | 170 | 120 | 90 | 60 |
| Membrane thickness | μm | 180 | 175.5 | 169.5 | 162 | 157.5 | 153 |
| Layer thickness d1 | μm | 36 | 49.5 | 67.5 | 90 | 103.5 | 117 |
| Layer thickness d2 | μm | 144 | 126 | 102 | 72 | 54 | 36 |
| Ratio d1/d2 | — | 0.25 | 0.39 | 0.66 | 1.25 | 1.92 | 3.25 |
| Bubble point | bar | 3.8 | 3.7 | 3.8 | 3.9 | 3.6 | 3.5 |
| Water flow time | min | 1.8 | 1.6 | 1.53 | 1.5 | 1.36 | 1.3 |
| Flow | ml/(cm$^2$.min.bar) | 14.8 | 16.7 | 17.5 | 17.8 | 19.6 | 20.5 |
| Throughput to clogging on fine-pored side | ml/cm$^2$ | 7.3 | 6.5 | 7.8 | 7.2 | 7.6 | 9.1 |
| Throughput to clogging on coarse-pored side | ml/cm$^2$ | 24 | 43 | 50 | 47 | 51 | 72 |
| Bacteria reduction per cm$^2$ (=LRV) with test bacteria Pseudomona Diminuta) | | >8 | >8 | >8 | >8 | 7.2 | 4.1 |

EXAMPLE 5

A layer of 160 μm of a solution of cellulose acetate and cellulose nitrate in a solvent mixture of acetone and butanol were poured out onto a glass plate. The solution had the following composition:

| | |
|---|---|
| Cellulose nitrate | 13.4% |
| Cellulose acetate | 1.0% |
| Acetone | 41.2% |
| Butanol | 41.4% |
| Ethanol | 1.7% |
| Water | 1.3% |

The viscosity of this solution was 2.13 Pa.s. After 20 seconds, a further layer was applied by drawing a further doctor blade with a gap width of 320 μm with a second solution over the first film. This solution had the following composition:

| | |
|---|---|
| Cellulose nitrate | 9.6% |
| Cellulose acetate | 0.7% |
| Acetone | 36.9% |
| Butanol | 47.1% |
| Ethanol | 3.5% |
| Water | 2.2% |

The viscosity of this solution was 0.63 Pa.s.

organic solvents and the solvent aid lithium chloride were poured out onto a glass plate. The solution had the following composition:

Aromatic polyamide: 15%
Dimethylformamide: 55.8%
Dimethylacimamide: 13.9%
Lithium chloride: 5.3%
Ethylene glycol: 10%

The viscosity of this solution was 14.4 Pa.s. After 10 seconds, a further layer was applied by drawing a further doctor blade having a gap width of 320 μm with a new solution over the first film. This solution had the following composition:

Aromatic polyamide: 10.0%
Dimethylformamide: 60.6%
Dimethylacimamide: 15.1%
Lithium chloride: 3.5%
Ethylene glycol: 10.8%

The viscosity of this solution was 0.73 Pa.s. After setting of the membrane at 95% relative humidity and 26° C. in stationary air (90 minutes), the membrane was washed in water and dried.

The following parameters were determined for the thus-obtained membrane:

Bubble point: 4.3 bar
Water flow: 9.3 ml/(cm$^2$min bar)

For throughput to clogging with a 1% aqueous raw sugar solution (model material) the following values were obtained:

Flow from fine-pored side: 6.1 ml/cm$^2$

Flow from coarse-pored side: 15.2 ml/cm$^2$

The present invention is, of course, in no way restricted to the specific disclosure of the specification, drawing and examples, but also encompasses any modifications within the scope of the appended claims.

What we claim is:

1. A multi-layer, unsupported, integral microfiltration membrane of polymeric material that is suitable for a phase inversion process, said membrane comprising:

at least one final filtration layer having a thickness of from 50 to 300 μm and a symmetrical pore structure; and at least one integrated prefiltration layer, wherein the ratio of said thickness of said final filtration layer to a thickness of said prefiltration layer is in the range of from 1:4 to 4:1, said multi-layered membrane having been formed by pouring out a first layer of a solution of polymeric material onto a substrate and subsequently successively pouring out one or more further layers of a solution of polymeric material onto said first layer prior the occurrence of turbidity in each successive immediately preceding layer, the viscosity of each successive layer of a solution of polymeric material having been the same as or less than that of the preceding layer.

2. A microfiltration membrane according to claim 1, which comprises one final filtration layer and two to four prefiltration layers.

3. A microfiltration membrane according to claim 1, which comprises one final filtration layer having a nominal pore size of from 0.1 to 2 μm, and one coarse-pored prefiltration layer.

4. A microfiltration membrane according to claim 1, wherein said final and prefiltration layers are built up of the same polymeric material.

5. A microfiltration membrane according to claim 1, for use in a filter cartridge.

6. A method of manufacturing a multi-layer, unsupported integral microfiltration membrane, said method including the steps of:

pouring out a first layer of a solution of polymeric material onto a substrate;

subsequently successively pouring out one or more further layers of a solution of polymeric material onto said first layer prior to the occurrence of turbidity of the immediately preceding layer, with the viscosity of each successive layer of a solution of polymeric material being the same as or less than that of the previous layer; and finally washing said thus produced membrane and subsequently drying said membrane.

7. A method according to claim 6, wherein said solutions of polymeric material have viscosities of between 0.5 and 25 Pa.s.

8. A method according to claim 7, wherein said solutions of polymeric material have viscosities of between 0.8 and 20 Pa.s.

9. A method according to claim 6, wherein the viscosity of a respective solution of polymeric material is established by the polymer content of a membrane-forming polymer.

10. A method according to claim 6, wherein the viscosity of a respective solution of polymeric material is established by the content of membrane-producing polymer and by the addition of one or more compatible polymers that are soluble in a nonsolvent for said membrane-forming polymer.

11. A method according to claim 6, wherein said viscosity of each successive layer of a solution of polymeric material is less than that of the previous layer.

12. A method according to claim 11, wherein said viscosity of each successive layer of a solution of polymeric material is less than the viscosity of the immediately preceding layer by at least a factor of 2.

13. A method according to claim 10, wherein said final filtration layer is defined by that polymer solution having the greatest content of polymer that is insoluble in nonsolvent.

14. A method according to claim 6, wherein the solution of polymeric material that defines the final filtration layer is used as the uppermost polymer solution.

15. A method according to claim 6, wherein the solution of polymeric material that defines the final filtration layer is used as the polymer solution for the lowermost layer.

16. A method according to claim 6, wherein polysulfone, polyethersulfone, aromatic polyamide, or cellulose derivative is used as membrane forming polymeric material.

17. A method according to claim 16, wherein at least one of the materials selected from the group consisting of polyvinylpyrolidone and polyethylene glycol is used as an additive to said membrane-forming polymer.

18. A method according to claim 6, wherein reinforcing fibers are disposed on said first layer of a solution of polymeric material after said step of pouring out same.

19. A method according to claim 6, wherein after the pouring out of said uppermost further layer of a solution of polymeric material, reinforcing fibers are disposed thereon.

20. A method according to claim 6, wherein after conclusion of all of said pouring out steps, and prior to said washing step, solvent is either evaporated or a vapor of a nonsolvent is diffused in.

* * * * *